United States Patent [19]

Holub et al.

[11] Patent Number: 4,504,632
[45] Date of Patent: Mar. 12, 1985

[54] AMIDE ETHER IMIDE BLOCK COPOLYMERS

[75] Inventors: Fred Holub, Schenectady, N.Y.; Daniel E. Floryan, Pittsfield, Mass.

[73] Assignee: General Electric Company, Pittsfield, Mass.

[21] Appl. No.: 567,334

[22] Filed: Dec. 30, 1983

[51] Int. Cl.³ .............................................. C08G 73/14
[52] U.S. Cl. .................................... 525/432; 525/431; 525/436; 528/26; 528/125; 528/126; 528/128; 528/172; 528/185
[58] Field of Search ............... 528/125, 126, 128, 172, 528/185, 26; 525/431, 432, 436

[56] References Cited

U.S. PATENT DOCUMENTS

| | | | |
|---|---|---|---|
| 3,894,114 | 7/1975 | Lohmann | 525/436 |
| 4,115,341 | 9/1978 | Boldebuck et al. | 260/33.2 R |
| 4,118,535 | 10/1978 | Banucci et al. | 428/383 |
| 4,258,155 | 3/1981 | Holub et al. | 525/436 |
| 4,332,929 | 6/1982 | Holub et al. | 528/185 |

*Primary Examiner*—Lester L. Lee
*Attorney, Agent, or Firm*—Bernard, Rothwell & Brown

[57] ABSTRACT

This invention is concerned with amide ether imide block copolymers and a method for their preparation. These block copolymers exhibit excellent glass transition temperatures which are suitable for the manufacture of filaments, fibers, films, coatings and molding compounds.

12 Claims, No Drawings

AMIDE ETHER IMIDE BLOCK COPOLYMERS

BACKGROUND OF THE INVENTION

The present invention relates to novel copolymers. More particularly, the invention concerns novel block copolymers which contain polyetherimide polymeric units.

Polyetherimides are amorphous, high-performance engineering thermoplastics. The chain structure of these polymers features rigid aromatic imide functionality and provides for high rigidity, creep resistance and high heat deflection temperatures. Polyetherimides exhibit high glass transition temperatures, and accordingly are generally processed at relatively high temperatures.

Polyamides or nylons are melt processible thermoplastics whose chain structure features repeating amide groups. They are generally semicrystalline with melting points ranging from 175° to 275° C. Unfortunately, nylons have low glass transition temperatures which render them unsuitable for many applications.

There exists a need for a polymer that exhibits moderate glass transition temperatures and has advantageous properties of both polyamides and polyetherimides.

SUMMARY OF THE INVENTION

In accordance with this invention, disclosed herein are amide ether imide block copolymers and methods for their preparation. The novel block copolymers contain polymeric units of the formulas:

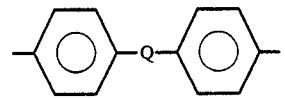

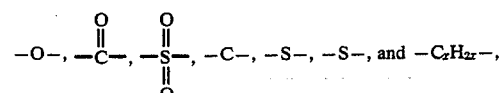

where a represents a whole number in excess of 1, e.g., 10 to 10,000 or more and Z is a member of the class consisting of (1):

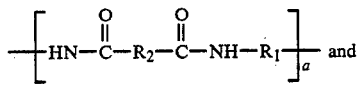

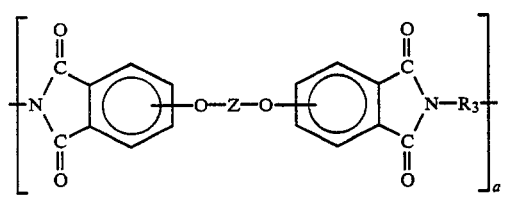

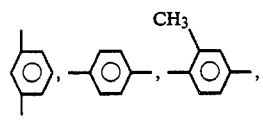

and (2) divalent organic radicals of the general formula:

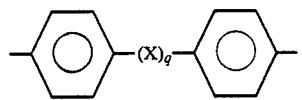

where X is a member selected from the class consisting of divalent radicals of the formulas: $-C_yH_{2y}-$,

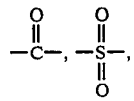

$-O-$ and $-S-$ where q is 0 or 1, y is a whole number from 1 to 5, the divalent bonds of the $-O-Z-O-$ radical are situated on the phthalic anhydride-derived units, e.g., in the 3,3'-, 3,4'-,4,3'-or the 4,4'-positions, and $R_1$, $R_2$ and $R_3$ are divalent organic radicals independently selected from the class consisting of (a) aromatic hydrocarbon radicals having from 6 to about 20 carbon atoms and halogenated derivatives thereof, (b) alkylene radicals and cycloalkylene radicals having from 2 to about 20 carbon atoms, $C_{(2-8)}$ alkylene terminated polydiorganosiloxane, and (c) divalent radicals included by the formula:

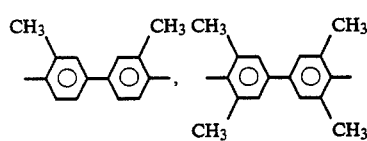

where Q is a member selected from the class consisting of:

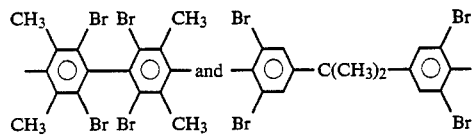

and x is a whole number from 1 to 5 inclusive.

DETAILED DESCRIPTION

The novel copolymers of the present invention are prepared by the polymerization of a reactive polycarboxylic group-containing compound, preferably an acid chloride, with an organic diamine to yield an amine terminated polyamide. To this reaction product is further added an aromatic bis(ether anhydride) and optionally an organic diamine. These components are reacted under polymerization conditions to produce the block copolymer of the present invention.

The organic diamines that are included are of the formula:

and

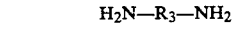

where $R_1$ and $R_3$ are as defined hereinabove. Organic diamines of Formulas III and IV include, for example, m-phenylenediamine, p-phenylenediamine,
4,4'-diaminodiphenylpropane,
4,4'-diaminodiphenylmethane,
benzidine,
4,4'-diaminodiphenyl sulfide,
4,4'-diaminodiphenyl sulfone,
4,4'-diaminodiphenyl ether,
1,5-diaminonaphthalene,
3,3'-dimethylbenzidine,
3,3'dimethoxybenzidine,
2,4-bis(β-amino-t-butyl)toluene,
bis(p-β-amino-t-butylphenyl)ether,
bis(p-β-methyl-o-aminopentyl)benzene,
1,3-diamino-4-isopropylbenzene,
1,2-bis(3-aminopropoxy)ethane,
m-xylylenediamine,
p-xylylenediamine,
2,4-diaminotoluene,
2,6-diaminotoluene,
bis(4-aminocyclohexyl)methane,
3-methylheptamethylenediamine,
4,4-dimethylheptamethylenediamine,
2,11-dodecanediamine,
2,2-dimethylpropylenediamine,
octamethylenediamine,
3-methoxyhexamethylenediamine,
2,5-dimethylhexamethylenediamine,
2,5-dimethylheptamethylenediamine,
3-methylheptamethylenediamine,
5-methylnonamethylenediamine,
1,4-cyclohexanediamine,
1,12-octadecanediamine,
bis(3-aminopropyl)sulfide,
N-methyl-bis(3-aminopropyl)amine,
hexamethylenediamine,
heptamethylenediamine,
nonamethylenediamine,
decamethylenediamine,
bis(3-aminopropyl)tetramethyldisiloxane,
bis(4-aminobutyl)tetramethyldisiloxane, etc.,
and mixtures of such diamines.

The reactive polycarboxylic group-containing compounds employed in making the copolymers of this invention include, for example, polycarboxylic acids, anhydrides and acid halides. Preferred polycarboxylic group-containing compounds are acid chlorides that are represented by the formula:

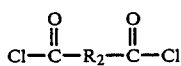
V.

where $R_2$ is as defined hereinabove. Acid chlorides of Formula V include for example,
adipylchloride,
malonyl chloride,
succinyl chloride,
glutaryl chloride,
pimelic acid dichloride,
suberic acid dichloride,
azelaic acid dichloride,
sebacic acid dichloride,
dodecanedioic acid dichloride,
phthaloyl chloride,
isophthaloyl chloride,
terephthaloyl chloride,
1,4-naphthalene dicarboxylic acid dichloride,
4,4'-diphenylether dicarboxylic acid dichloride and the like.

The aromatic bis(ether dianhydride)s that are subsequently reacted with the reaction product of the diamine and reactive polycarboxylic group-containing compound are of the formula,

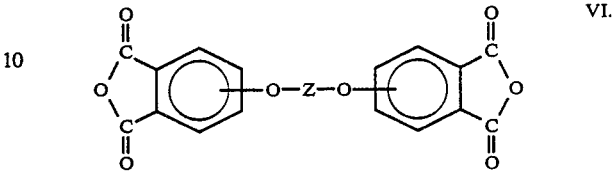
VI.

where Z is as defined hereinbefore. Aromatic bis(ether anhydride)s of Formula IV include, for example,
2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)benzophenone dianhydride;
4,4'-bis(2,3-dicarboxyphenoxy)diphenyl sulfone dianhydride;
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy)diphenyl-2,2-propane dianhydride; etc., and mixtures of such dianhydrides.

The reaction between the diamine and the reactive polycarboxylic group-containing compound is conducted under polyamide-forming conditions. Generally, equimolar amounts of the acid chloride and diamine can be employed, however, a molar excess of diamine is preferred in order to produce an amine terminated polyamide of the formula,

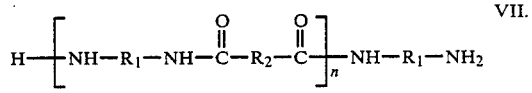
VII.

where $R_1$ and $R_2$ are as defined hereinabove, and n is an integer from about 1 to about 20 preferably from about 1 to about 4. These reactions are advantageously conducted under substantially anhydrous conditions in a basic, nonreactive solvent, such as N-methylpyrrolidone, pyridine, or the like. Synthetic methods for preparing polyamides are well known, and the copolymers of the present invention are not limited to any particular synthetic procedure.

After the above reactants have been polymerized, the aromatic bis(ether anhydride) and optionally additional organic diamine are added. In general, equimolar amounts of the total diamine (i.e., amine-terminated polyamide plus additional organic diamine) and the aromatic bis(ether anhydride) are combined. Depending on the desired proportion of polymeric units, the molar ratio of the amine terminated polyamide and aromatic bis(ether anhydride) can vary. The mole ratio of amine terminated polyamide to anhydride can range from 1 to 99 mole percent polyamide to 99 to 1 mole percent aromatic bis(ether anhydride).

The reaction between the anhydride, the amine terminated polyamide and organic diamine can be advantageously carried out employing well-known solvents, e.g., o-dichlorobenzene, m-cresol/toluene, etc., in which to effect interaction between the reactants, at temperatures of from about 100° C. to about 250° C. Alternatively, the block copolymers can be prepared by melt polymerization while heating the mixture of the ingredients at elevated temperatures with concurrent intermixing. Generally, melt polymerization temperatures between about 200° C. to 400° C. and preferably 230° C. to 300° C. can be employed. Any order of addition of chain stoppers ordinarily employed in melt polymerization can be employed. The conditions of the reaction and the proportions of ingredients can be varied widely depending on the desired molecular weight, intrinsic viscosity, and solvent resistance.

As used herein and in the appended claims, the amount or weight percent of each polymeric unit, as defined by Formula I and II, can vary. The amount of each polymeric unit are controlled by the methods of preparation. The polymeric unit of Formula I can be from 5 to 95 mole percent of the block copolymers, with the balance being the polymeric unit of Formula II. Preferred polymers are those in which the polymeric unit of Formula I is from 10 to 90 mole percent of the block copolymer, most preferably from about 20 to 80 mole percent of the block copolymer.

By controlling the proportions of the polymeric units, each having predetermined properties, a block copolymer can be formed having certain superior properties over a polyamide or polyetherimide. In general, the higher the proportion of polymeric units of Formula I will result in a block copolymer having lower glass transition temperatures, for example 60° C. On the other hand, a block copolymer having a lower proportion of the polymeric units of Formula I will have a higher glass transition temperature, for example, 100° C.

The invention is further illustrated by the following examples which are not intended to be limiting.

EXAMPLE I

Several aliphatic amide ether imide block copolymers were prepared. To a suitable reaction vessel was charged 15 cc of N-methyl pyrrolidone (NMP). Hexamethylene diamine (HMDA) was added to the NMP. Adipylchloride was then added and mixed in an amount such that the mixture contained a 10% molar excess of HMDA. Additional HMDA was added with equivalent moles of 2,2-bis[4-(2,3-dicarboxyphenoxy)phenyl]-propane dianhydride (BPADA). The polymer solutions were cast and films were obtained after heating at 250°-290° C. The table below lists the varying amounts of reactants. Also listed are the respective glass transition temperatures (Tg's) of the product block copolymer. The Tg's were determined on the films using a differential scanning calorimeter at a 40° C. per minute heating rate, taking a midpoint transition after a second rapid cool.

For purposes of comparison, polyamide and polyetherimide, were produced and tested.

TABLE I

| No. | Adipyl Chloride g | Adipyl Chloride moles | HMDA g | HMDA moles | BPADA g | BPADA moles | HMDA g | HMDA moles | cc NMP | Tg °C. |
|---|---|---|---|---|---|---|---|---|---|---|
| 1 | 1.83 | 0.01 | 1.16 | 0.01 | — | — | — | — | 15 | 50 |
| 2 | 1.65 | 0.009 | 1.14 | 0.0099 | 0.52 | 0.001 | 0.02 | 0.0001 | 15 | 60 |
| 3 | 1.28 | 0.007 | 0.89 | 0.0077 | 1.56 | 0.003 | 0.27 | 0.0023 | 15 | 70 |
| 4 | 0.92 | 0.005 | 0.64 | 0.0055 | 2.60 | 0.005 | 0.52 | 0.0045 | 15 | 108 |
| 5 | 0.55 | 0.003 | 0.38 | 0.0033 | 3.64 | 0.007 | 0.78 | 0.0067 | 15 | 112 |
| 6 | 0.18 | 0.001 | 0.13 | 0.0011 | 4.68 | 0.009 | 1.03 | 0.0089 | 15 | 109 |
| 7 | — | — | — | — | 5.20 | 0.01 | 1.16 | 0.01 | 15 | 123 |

Example I was repeated with the exception that all the HMDA was added to the reaction vessel containing the NMP. The adipyl chloride was then added and the reactants were mixed. The BPADA was then subsequently added. The Table below lists the amount of reactants and the Tg's of the respective block copolymers.

TABLE II

| No. | BPA—DA Gms | BPA—DA Moles | Adipyl Chloride Gms | Adipyl Chloride Moles | Hexamethylene Diamine (HMDA) Gms | Hexamethylene Diamine (HMDA) Moles | cc NMP | Tg °C. |
|---|---|---|---|---|---|---|---|---|
| 8 | — | — | 1.83 | 0.01 | 1.16 | .01 | 15 cc | 50 |
| 9 | 0.52 | 0.001 | 1.65 | 0.009 | 1.16 | .01 | 15 cc | 43 |
| 10 | 1.56 | 0.003 | 1.28 | 0.007 | 1.16 | .01 | 15 cc | 92 |
| 11 | 2.60 | 0.005 | 0.92 | 0.005 | 1.16 | .01 | 15 cc | 107 |
| 12 | 3.64 | 0.007 | 0.55 | 0.003 | 1.16 | .01 | 15 cc | 113 |
| 13 | 4.68 | 0.009 | 0.18 | 0.001 | 1.16 | .01 | 15 cc | 122 |
| 14 | 5.20 | 0.01 | — | — | 1.16 | .01 | 15 cc | 123 |

EXAMPLE II

Several additional block copolymers were formed. These block copolymers were aromatic aliphatic amide ether imide block copolymers. The copolymers were made by the sequential addition of isophthaloyl chloride to hexamethylene diamine followed by stoichiometric addition of BPADA in NMP. The polymer solutions were cast and films were obtained after heating at 250°-290° C. The table below lists the varying amounts of reactants. Also listed are the respective Tg's of the product block copolymer. For purposes of comparison, polyamide and polyetherimide homopolymers were produced and tested.

TABLE III

| No. | BPA—DA Gms. | BPA—DA Moles | Isophthaloyl Chloride Gms. | Isophthaloyl Chloride Moles | Hexamethylene Diamine HMDA Gms. | Hexamethylene Diamine HMDA Moles | cc NMP | Tg °C. Mid Point |
|---|---|---|---|---|---|---|---|---|
| 15 | — | — | 2.03 | 0.010 | 1.16 | 0.010 | 15 | 111.2 |
| 16 | 0.52 | 0.001 | 1.83 | 0.009 | 1.16 | 0.010 | 15 | 115.3 |
| 17 | 1.56 | 0.003 | 1.42 | 0.007 | 1.16 | 0.010 | 15 | 112.6 |
| 18 | 2.60 | 0.005 | 1.02 | 0.005 | 1.16 | 0.010 | 15 | 113.6 |
| 19 | 3.64 | 0.007 | 0.61 | 0.003 | 1.16 | 0.010 | 15 | 124.2 |

TABLE III-continued

| No. | BPA—DA Gms. | BPA—DA Moles | Isophthaloyl Chloride Gms. | Isophthaloyl Chloride Moles | Hexamethylene Diamine HMDA Gms. | Hexamethylene Diamine HMDA Moles | cc NMP | Tg °C. Mid Point |
|---|---|---|---|---|---|---|---|---|
| 20 | 4.68 | 0.009 | 0.20 | 0.001 | 1.16 | 0.010 | 15 | 123.5 |
| 21 | 5.20 | 0.01 | — | — | 1.16 | 0.010 | 15 | 137.7 |

As illustrated by the above data, block copolymers having improved properties are obtained where the polymer chain contains both structural units of Formula I and II.

The block copolymers of the present invention have application in a wide variety of physical shapes and form, including the use as films, molding compounds, filaments, fibers, coatings, etc. When used as films or when made into molded products, these polymers, including laminated products prepared therefrom, not only possess good physical properties at room temperature but they retain their strength and excellent response to work-loading at elevated temperatures for long periods of time. Films formed from the polymeric compositions of this invention may be used in applications where films have been used previously. Thus, the compositions of the present invention can be used in automobile and aviation applications for decorative and protective purposes, and as high temperature electrical insulation for motor slot liners, in transformers, as dielectric capacitors, as coil and cable wrappings (form wound coil insulation for motors), for containers and container linings, in laminating structures where films of the present composition or where solutions of the claimed compositions of matter are applied to various heat-resistant or other types of materials such as asbestos, mica, glass fiber and the like and superimposing the sheets one upon the other and thereafter subjecting them to elevated temperatures and pressures to effect flow and cure of the resinous binder to yield cohesive laminated structures. Films made from these compositions of matter can also serve in printed circuit applications.

Alternatively, solutions of the compositions herein described can be coated on electrical conductors such as copper, aluminum, etc., and thereafter the coated conductor can be heated at elevated temperatures to remove the solvent and to effect curing of the resinous composition thereon. If desired, an additional overcoat may be applied to such insulated conductors including the use of polymeric coatings, such as polyamides, polyesters, silicones, polyvinylformal resins, epoxy resins, polyimides, polytetrafluoroethylene, etc. The use of the curable compositions of the present invention as overcoats on other types of insulation is not precluded.

Applications which recommend these resins include their use as binders for asbestos fibers, carbon fibers, and other fibrous materials in making brake linings. In addition, molding compositions and molded articles may be formed from the polymeric compositions in this invention by incorporating such fillers as asbestos, glass fibers, talc, quartz, powder, wood flour, finely divided carbon, silica, into such compositions prior to molding. Shaped articles are formed under heat, or under heat and pressure in accordance with practices well-known in the art. In addition, various heat-resistant pigments and dyes may be incorporated as well as various types of inhibitors depending on the application intended.

While certain representative embodiments and details have been shown for purposes of illustrating the invention, it will be apparent to those skilled in the art that various changes and modifications may be made therein without departing from the scope of the invention.

We claim:

1. An amide ether imide block copolymer wherein the block copolymer consists essentially of polymeric units of the formulas:

$$\left[ -HN-\overset{O}{\underset{\|}{C}}-R_2-\overset{O}{\underset{\|}{C}}-NH-R_1- \right]_a \quad \text{I.}$$

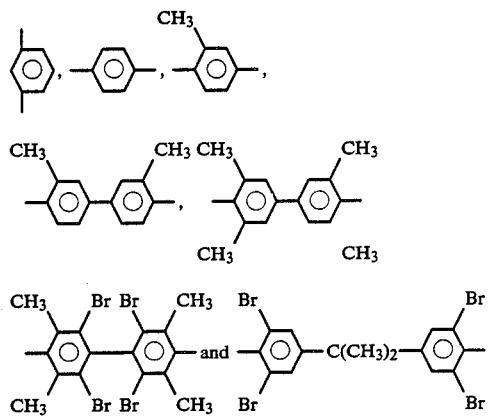

where "a" represents a whole number in excess of 1, and Z is a member of the class consisting of (1)

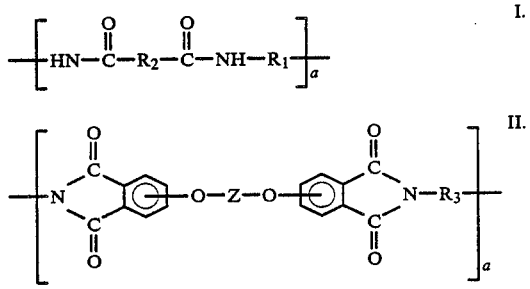

and (2) divalent organic radicals of the general formula:

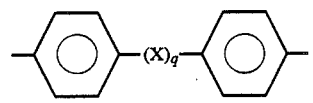

where X is a member selected from the class consisting of divalent radicals of the formulas: $-C_yH_{2y}-$,

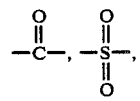

—O— and —S— where q is 0 or 1, y is a whole number from 1 to 5, the divalent bonds of the —O—Z—O— radical are situated on the phthalic anhydride-derived units, in the 3,3'-, 3,4'-,4,3'-or the 4,4'-positions, and $R_1$, $R_2$ and $R_3$ are divalent organic radicals independently selected from the class consisting of (a) aromatic hydrocarbon radicals having from 6 to about 20 carbon atoms and halogenated derivatives thereof, (b) alkylene radicals and cycloalkylene radicals having from 2 to about 20 carbon atoms, C(2-8) alkylene terminated polydiorganosiloxane, and (c) divalent radicals included by the formula:

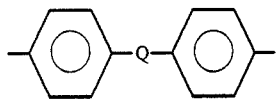

where Q is a member selected from the class consisting of: —O—,

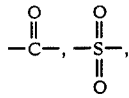

—S—, and —C$_x$H$_{2x}$—, and x is a whole number from 1 to 5 inclusive.

2. The block copolymer of claim 1 wherein the polymeric unit of Formula I is from about 5 to about 95 mole percent of the block copolymer.

3. The block copolymer of claim 1, wherein the polymeric unit of Formula I is from about 10 to about 90 mole percent of the block copolymer.

4. The block copolymer of claim 1, wherein the polymeric unit of Formula I is from about 20 to 80 mole percent of the block copolymer.

5. The block copolymer of claim 1 wherein R$_2$ is an alkylene radical having from 2 to about 20 carbon atoms.

6. The block copolymer of claim 1 wherein R$_2$ is an aromatic radical having from 6 to about 20 carbon atoms.

7. The block copolymer of claim 1 wherein R$_1$ is an alkylene radical having from 2 to about 20 carbon atoms.

8. The block copolymer of claim 7 wherein R$_1$ is an aromatic radical having from 6 to about 20 carbon atoms.

9. The block copolymer of claim 1 where Z is of the formula:

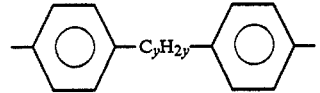

where y is a whole number from 1 to about 5.

10. The block copolymer of claim 9, wherein R$_3$ is metaphenylene and Z is a group of the formula:

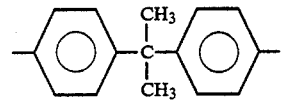

11. A process for the production of an amide ether imide block copolymer comprising reacting an acid chloride of the formula:

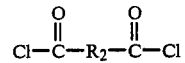

V.

with at least a molar equivalent of an organic diamine of the formula:

III.

under polymerization conditions to form an amine terminated polyamide of the formula,

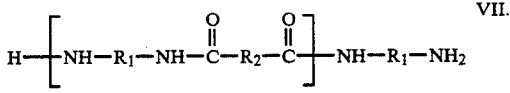

VII.

thereafter reacting said amine terminated amide with an aromatic bis(ether anhydride) of the formula:

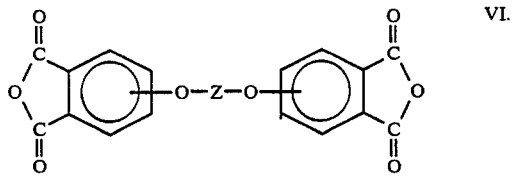

VI.

to form an amide ether imide block copolymer; where Z is a member of the class consisting of (1)

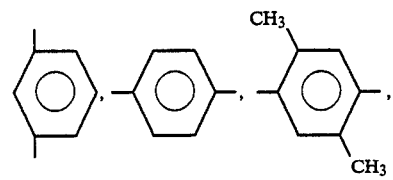

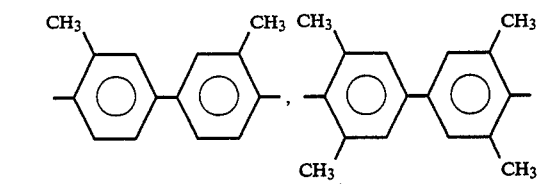

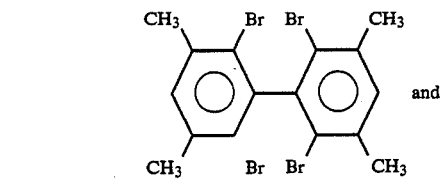

and

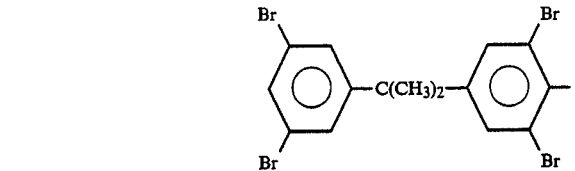

and (2) divalent organic radicals of the general formula:

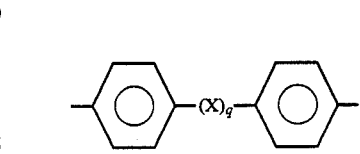

where X is a member selected from the class consisting of divalent radicals of the formulas: —C$_y$H$_{2y}$—,

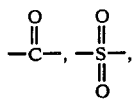

—O— and —S— where q is 0 or 1, y is a whole number from 1 to 5, the divalent bonds of the —O—Z—O— radical are situated on the phthalic anhydride-derived units, in the 3,3'-, 3,4'-,4,3'-or the 4,4'-positions, and $R_1$ and $R_2$ are divalent organic radicals selected from the class consisting of (a) aromatic hydrocarbon radicals having from 6 to about 20 carbon atoms and halogenated derivatives thereof, (b) alkylene radicals and cycloalkylene radicals having from 2 to about 20 carbon atoms, $C_{(2-8)}$ alkylene terminated polydiorganosiloxane, and (c) divalent radicals included by the formula:

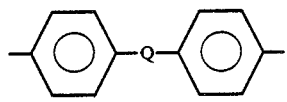

where Q is a member selected from the class consisting of: —O—,

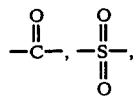

—S—, and —$C_xH_{2x}$—, and x is a whole number from 1 to 5 inclusive.

12. A process for the production of an amide ether imide copolymer comprising polymerizing an organic diamine of the formula, $$H_2N—R_1—NH_2 \qquad III.$$

with an acid chloride of the formula,

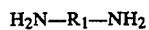

and polymerizing the reaction product with an aromatic bis(ether anhydride) of the formula,

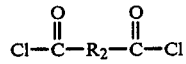

where the number of moles of diamine reacted is equal to the total moles of acid chloride and aromatic bis(ether anhydride) combined and Z is a member of the class consisting of (1):

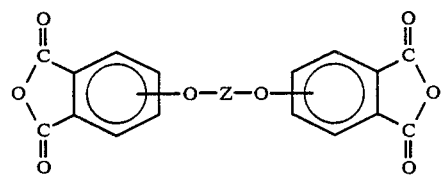

and (2) divalent organic radicals of the general formula:

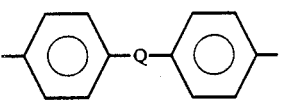

where X is a member selected from the class consisting of divalent radicals of the formulas: —$C_yH_{2y}$—,

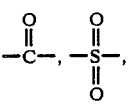

—O— and —S— where q is 0 or 1, y is a whole number from 1 to 5, the divalent bonds of the —O—Z—O— radical are situated on the phthalic anhydride-derived units, in the 3,3'-, 3,4'-,4,3'-or the 4,4'-positions, and $R_1$ and $R_2$ are divalent organic radicals selected from the class consisting of (a) aromatic hydrocarbon radicals having from 6–20 carbon atoms and halogenated derivatives thereof, (b) alkylene radicals and cycloalkylene radicals having from 2–20 carbon atoms, $C_{(2-8)}$ alkylene terminated polydiorganosiloxane, and (c) divalent radicals included by the formula:

where Q is a member selected from the class consisting of: —O—,

—S—, and —$C_xH_{2x}$—,
and x is a whole number from 1 to 5 inclusive.

* * * * *